US012387483B2

(12) United States Patent
Krafka et al.

(10) Patent No.: US 12,387,483 B2
(45) Date of Patent: Aug. 12, 2025

(54) SYSTEMS, METHODS, AND APPARATUS FOR TESTING UAV DEVICES

(71) Applicant: Wing Aviation LLC, Mountain View, CA (US)

(72) Inventors: Kyle Krafka, Los Altos, CA (US); Trevor Shannon, Mountain View, CA (US)

(73) Assignee: Wing Aviation LLC, Palo Alto, CA (US)

( * ) Notice: Subject to any disclaimer, the term of this patent is extended or adjusted under 35 U.S.C. 154(b) by 369 days.

(21) Appl. No.: 18/057,661

(22) Filed: Nov. 21, 2022

(65) Prior Publication Data

US 2024/0169718 A1    May 23, 2024

(51) Int. Cl.
*G06V 20/17* (2022.01)
*B64U 20/77* (2023.01)
*B64U 20/87* (2023.01)

(52) U.S. Cl.
CPC ............. *G06V 20/17* (2022.01); *B64U 20/77* (2023.01); *B64U 20/87* (2023.01)

(58) Field of Classification Search
CPC ......... G06V 20/17; B64U 20/77; B64U 20/87
USPC ........................................................ 382/106
See application file for complete search history.

(56) References Cited

U.S. PATENT DOCUMENTS

| 2018/0002017 | A1  | 1/2018 | Abeles et al. |
| 2023/0249822 | A1* | 8/2023 | Burgess ............... B64D 1/12 701/3 |

FOREIGN PATENT DOCUMENTS

| CN | 108557113 A | 9/2018 |
| CN | 112173170 A | 1/2021 |
| KR | 10-2148938 B1 | 8/2020 |
| KR | 10-2022-0067578 A | 5/2022 |
| KR | 20220067578 | * 5/2022 ............... B64F 5/60 |

OTHER PUBLICATIONS

International Search Report and Written Opinion for corresponding PCT application No. PCT/US2023/078501 dated Feb. 22, 2024.

* cited by examiner

*Primary Examiner* — Jerome Grant, II
(74) *Attorney, Agent, or Firm* — McDonnell Boehnen Hulbert & Berghoff LLC

(57) ABSTRACT

Systems, apparatus, and methods are presented for testing a device. One method includes activating an actuator device to cause a carriage, coupled to a device, to be moved in one or more directions along a guide rail, wherein the device includes at least one processing device and one or more sensor devices. The method may also comprise receiving, by the device, one or more input commands and executing, by the device based on the one or more input commands, a software application to generate an output while the device is moving in the one or more directions. Further, the method may comprise verifying the execution of the software application on the device based on the output.

20 Claims, 7 Drawing Sheets

SYSTEMS, METHODS, AND APPARATUS FOR TESTING UAV DEVICES

BACKGROUND

An important aspect of product development is the testing of a product, such as an electronic device. Testing normally occurs in several phases, for example, engineering testing, development testing, alpha testing, and beta testing. Such testing helps to ensure that the product meets its specification requirements, including functioning in a target environment. Typically, product developers may test a product using emulators that virtualize both the hardware and software of the product. Unfortunately, emulators are significantly slower than the physical product in view of the interpretations or translations that are involved during their operation. Additionally, simulators, which may replicate the software of the product but not its hardware, may not provide a realistic alternative to the physical product and may be inadequate for development and testing. Further, some products may require simulation of a real or physical environment to test particular operations, especially products designed for movement or flight. However, to test flight operations of an unmanned aerial or aircraft product, a large outdoor or indoor test range may be needed. Further, the testing of aircraft products including its cameras may be difficult and time consuming. Thus, a test platform to evaluate the performance of a product in a target environment is desirable.

BRIEF SUMMARY

The embodiments of the present application provide systems, methods, and apparatus for testing hardware and software components of a device or product. The embodiments may evaluate the operations and/or performance of the hardware and software components of the device. The device may receive various inputs or commands and may implement various operations and/or functions according to a test program. For example, the embodiments may simulate real or physical conditions of an environment in which the device may operate. The embodiments may accelerate and/or move the device in one or more directions and may position or tilt the device in a number of orientations. While the device is in motion, the embodiments may test and verify the operations and/or the performance of the device including the execution of the software applications that run on the device. Further, the embodiments may verify the calibration of a camera of the device and may estimate the velocity of the device based on sensor data. Thus, the techniques of the embodiments may be advantageous because the operation of the hardware and software of the device may be tested based on conditions of a target environment.

In one aspect, the present application describes an apparatus for testing a device. The apparatus may comprise a guide rail supported by a frame and a carriage configured to be movably mounted to the guide rail. The device may be configured to be coupled to the carriage and include at least one processing device and one or more sensor devices. The apparatus may also comprise an actuator device configured to cause the carriage to move along the guide rail. Further, the apparatus may comprise a computing device in communication with the actuator device. The actuator device may be configured to be activated based on commands from the computing device to cause the carriage to move in one or more directions.

In another aspect, a method for testing a device using a testing apparatus including a carriage mounted to a guide rail is disclosed. The method may comprise activating an actuator device to cause the carriage, coupled to the device, to be moved in one or more directions along the guide rail, wherein the device includes at least one processing device and one or more sensor devices. The method may also comprise receiving, by the device, one or more input commands and executing, by the device based on the one or more input commands, a software application to generate an output while the device is moving in the one or more directions. Further, the method may comprise verifying the execution of the software application on the device based on the output.

In still another aspect, a non-transitory computer-readable medium storing instructions is disclosed that, when the instructions are executed by one or more processors, causes the one or more processors to perform operations. The operations may include activating an actuator device to cause a carriage, coupled to a device, to be moved in one or more directions along a guide rail, wherein the device includes at least one processing device and one or more sensor devices. The operations may also include receiving one or more input commands and executing, based on the one or more input commands, a software application to generate an output while the device is moving in the one or more directions. Further, the operations may include verifying the execution of the software application on the device based on the output.

These as well as other aspects, advantages, and alternatives will become apparent to those of ordinary skill in the art by reading the following detailed description, with reference where appropriate to the accompanying drawings. Further, it should be understood that this summary and other descriptions and figures provided herein are intended to illustrate embodiments by way of example only and, as such, that numerous variations are possible. For instance, structural elements and process steps can be rearranged, combined, distributed, eliminated, or otherwise changed, while remaining within the scope of the embodiments as claimed.

BRIEF DESCRIPTION OF DRAWINGS

Reference will now be made to the accompanying figures and flow diagrams, which are not necessarily drawn to scale, and wherein.

DETAILED DESCRIPTION

Figure 1:
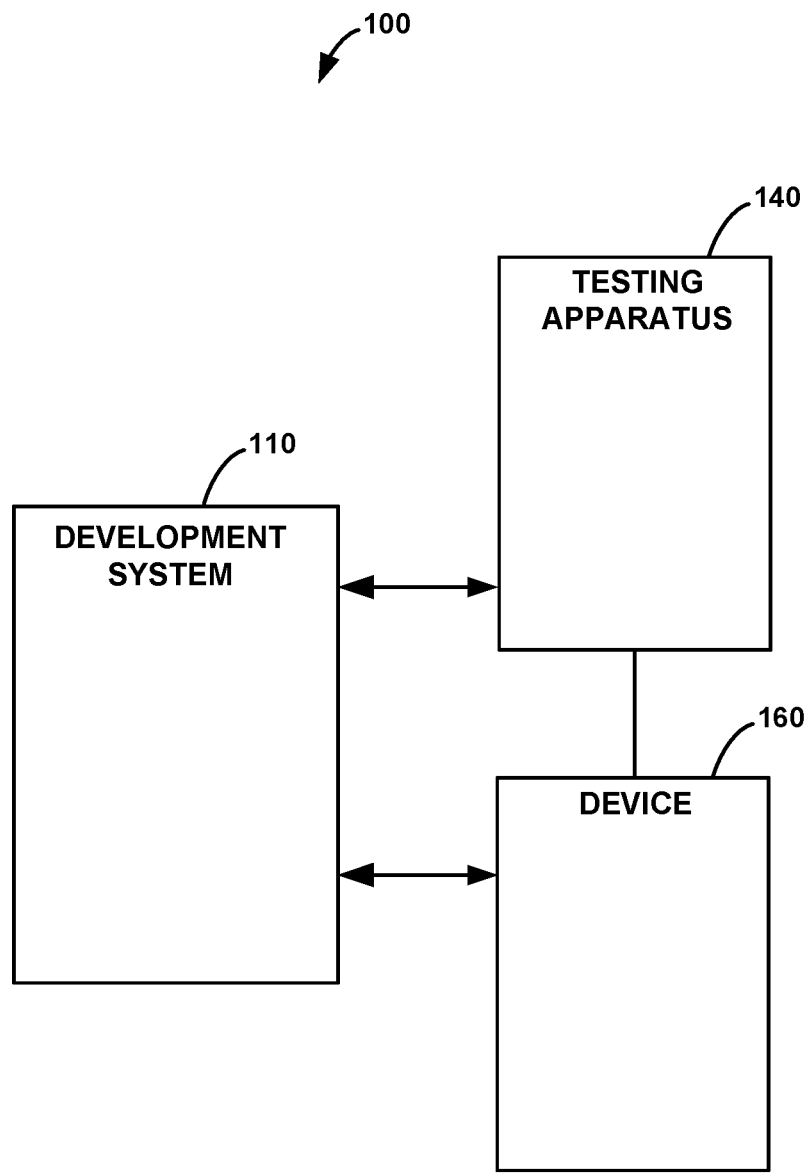
FIG. 1 illustrates of a simplified block diagram of a system for testing a device, according to an example embodiment.

Example systems, methods, devices, and apparatus are described herein. It should be understood that the words "example" and "exemplary" are used herein to mean "serving as an example, instance, or illustration." Any embodiment or feature described herein as being an "example," "exemplary," and/or "illustrative" is not necessarily to be construed as preferred or advantageous over other embodiments or features unless stated as such. Thus, other embodiments can be utilized and other changes can be made without departing from the scope of the subject matter presented herein. Accordingly, the example embodiments described herein are not meant to be limiting. It will be readily understood that the aspects of the present disclosure, as generally described herein, and illustrated in the figures, can be arranged, substituted, combined, separated, and designed in a wide variety of different configurations.

Further, unless context suggests otherwise, the features illustrated in each of the figures may be used in combination with one another. Thus, the figures should be generally viewed as component aspects of one or more overall embodiments, with the understanding that not all illustrated features are necessary for each embodiment. Additionally, any enumeration of elements, blocks, or steps in this specification or the claims is for purposes of clarity. Thus, such enumeration should not be interpreted to require or imply that these elements, blocks, or steps adhere to a particular arrangement or are carried out in a particular order. Unless otherwise noted, figures are not drawn to scale.

Simulation may be critical for the ability to develop and maintain reliable on-vehicle software. In some cases, simulation may be performed on servers (software-in-the-loop or SIL simulation) at a large scale, but the servers may not account for the way software works on vehicle-specific hardware. For example, an algorithm might produce the correct result on a server, but it might be computed with such latency that it may not be useful on the vehicle. Further, the algorithm could produce an incorrect result when run on the vehicle due to differences in hardware. For this reason, hardware-in-the-loop (HIL) simulation may be used. In HIL, hardware sensors may be instrumented so as to be "faked out." In some cases, some special hardware may be used to produce fake inputs based on the state of the simulator. For example, when simulating flights in Australia, fake Global Navigation Satellite System (GNSS) satellite radio waves may be generated so that a GNSS receiver will determine that the vehicle is located in Australia. This approach may work well for some of the aircraft's sensors.

One exception, however, is cameras. Camera information is typically difficult to fake, due to the high volume of information. First, it may be difficult to render suitably-realistic imagery from a simulation state in real-time. Second, it may be difficult to feed this information into the camera hardware. Finally, it may be difficult to test multiple cameras that operate in a synchronized manner. Thus, to test software on the hardware of an aircraft prior to flying, a testing apparatus may be used.

In some examples, the testing apparatus may consist of an "avionics bay" which houses an aircraft's primary computer hardware as well as downward-facing cameras, a "gantry" which is a free-standing support for a rail along which the avionics bay can move, a "stepper motor" which can position the avionics bay anywhere along the rail (via a belt that runs the length of the rail), a "programmable power supply" which controls power to the avionics bay, programmable light-emitting diode (LED) strip lights which illuminate the region underneath the avionics bay, and a "host" computer, which controls the stepper motor, the power supply, and the avionics bay. In some embodiments, the host computer may command the stepper motor to move the avionics bay back and forth along the rail to generate predictable motion for the cameras to process.

The testing apparatus may allow a product developer to test central processing unit (CPU) performance, camera startup, frame delivery rate, installation processes, backend handling of flight control telemetry and mission data, camera calibration, position estimation, and/or velocity estimation software (which leverages synchronized camera and inertial measurement unit data). As such, the testing platform may be used as a part of an on-vehicle software release process. The testing apparatus may also facilitate reproducing issues or errors in a controlled environment. Further, the testing apparatus may replace "endurance tests" which previously required hours of flight test for each release. Additionally, the testing apparatus may be used to evaluate and test camera performance in low-light.

In some examples, a user or product developer may develop a software release for validation. To validate the software, the product developer may configure the testing apparatus to install the software release from a backend or host computer. The user then logs into the host computer and remotely "power cycles" (turns the power supply's output off then on again) the aircraft to simulate an operator disconnecting and reconnecting the battery in the field. After some time, the software will be installed.

After the user configures a test or "experiment" on the testing apparatus, the user may start the test. The host computer may automatically conduct multiple tests by power cycling the avionics bay and then moving it back and forth, all the while faking out connections to a control tier and to a mission management system. The user may await the results on a dashboard, which will parse and present the information in a pass/fail manner. The test may be conducted without lights and/or without motion. Further, objects may be set up or placed around or below the testing apparatus (e.g., markers, fiducials, targets, etc.) to test various operations. Accordingly, the testing apparatus may replace considerable operator and developer time by automating processes and providing a controlled environment to validate software and hardware end-to-end.

The embodiments of the present application relate to systems, methods, and apparatus for testing the operation and/or performance of hardware and software components of a device. Referring now to the drawings, FIG. 1 illustrates a block diagram of a system 100 configured to test hardware and software components of the device, according to an example embodiment. For example, the system 100 may be used for evaluating the performance of the operations and/or functions of a device. As shown in FIG. 1, the system 100 may include a development or remote system 110, a testing or simulation apparatus 140, and a device 160.

The development system 110 may comprise a host computing system, a simulator, a desktop computer, or a workstation. In other embodiments, the development system 110 may be any type of device, including a laptop computer, a tablet computer, or any similar device. The development system 110 may be adapted or operable to execute any operating system including Microsoft's Windows®, UNIX, and Linux.

In some instances, a product or software developer may use the development system 110 to develop and test software applications or code intended to run on the device 160. For this purpose, the product developer may install and execute the software applications on the development system 110 to emulate or replicate operations or functions that are intended to be performed by the device 160. The product developer may write the software applications executable by the development system 110 to simulate how the software applications will operate on the device 160 for which the software application is written.

To test the software applications, the product developer may, through the development system 110, simulate inputs intended for the device 160. For example, the product developer may simulate user input specific for the device 160 or may simulate an operating environment of the device 160 via the development system 110. In one example, keystrokes, text entry, or mouse input via the development system 110 may simulate input commands specific to input mechanisms of the device 160.

The product developer may, to a certain degree, verify the operation of the software applications by entering or inputting individual commands manually via an user interface (e.g., enter in each command and manually verify a desired response through viewing a graphical representation of a device display). However, it may be desirable for a product developer to exhaustively test software applications for the device 160 on the development system 110 prior to any customer or commercial release. As such, the product developer may create a test program to simulate a series of inputs in a sequence to emulate execution of the software applications by device 160 on the development system 110. The results of the test program may be verified to determine whether the software applications executed by the development system 110 responded as expected to the user input defined by the test program.

Verifying the operations of software applications for execution on the device 160 via the development system 110 may be advantageous. For instance, a product developer may run a large number of application software tests relatively quickly because, in some examples, the development system 110 may have superior computing power in comparison to the device 160. Although the development system 110 may provide some feedback to a product developer regarding the operation of the software applications by the device 160, the development system 110 may not be able to emulate certain aspects of the hardware or the conditions of the environment of the device 160. For example, the development system 110 may not be able to emulate actual motion or acceleration of the device 160 for testing certain features while the device 160 is in motion in a target environment. As such, the software applications executed on the development system 110 may not function in the same manner (e.g., generate the same device output) as compared to the execution of the software applications on the device 160.

Therefore, it may be advantageous to test software applications written for the device 160 directly on the device 160 and to test the software and hardware components of the device 160 while simulating conditions of a target environment. To test the software applications directly on the device 160, the product developer may load the software applications on the device 160 and operate the device 160 via inputs from the development system 110. The development system 110 may verify the results (e.g., verify outputs of the device 160). In some cases, it may be desirable to test the operation of the device 160 more thoroughly than manual testing and verification can reasonably provide. As such, it may be desirable to use the testing apparatus 140 to simulate real or actual conditions of the operating environment for testing the software applications executing on the device 160 and the hardware components of the device 160.

In some cases, the device 160 may be coupled or mounted to the testing apparatus 140 of the system 100. The testing apparatus 140 may be in communication with the development system 110 and/or device 160 and may simulate various conditions for testing the device 160 in a target environment. For example, the testing apparatus 140 may receive control signals from the development system 110 and/or the device 160 to simulate conditions of the environment in which the device 160 operates. For example, the testing apparatus 140 may perform operations to simulate acceleration and/or motion of the device 160. In some embodiments, the testing apparatus 140 may be configured to cause the device 160 to move in one or more directions. For instance, the testing apparatus 140 may cause the device 160 to move the device back and forth along a path or axis. In other embodiments, the testing apparatus may move the device 160 vertically and/or horizontally and may position or tilt the device 160 in various orientations to test certain functions.

In some cases, the product developer may create a test program and run the test program on development system 110 to control the operation of the testing apparatus 140 and the device 160. For example, after a software application to be tested is loaded on the device 160, the testing apparatus 140 and/or the device 160 may be operated based on the inputs generated from the test program executed by the development system 110. In some embodiments, the test program may be loaded on the device 160 and the device 160 may execute the test program to operate or generate inputs for the device 160 and/or control the operations of the test apparatus 140. For example, the testing apparatus 140 may simulate various conditions in accordance with the test program and the device 160 may generate outputs based on the inputs to the device 160. In some embodiments, the device 160 may include an unmanned vehicle or aircraft, such as a drone.

To verify the software applications and/or the device hardware, the outputs of the device 160 may be captured and analyzed. In one example, the output of the device may include one or more images or videos that represent output of the device 160. The images captured by the device 160 may be analyzed to determine desirable image characteristics or to facilitate camera calibration. In other examples, the software applications installed on device 160 may not be solely for the capture of images and/or videos. For example, the software applications may include program instructions related to the processing of user input (e.g., whether to accept a particular type of user input, what action to perform in response to the user input). In other examples, the software applications include data and or program instructions related to other forms of device output, such as the velocity of the device 160. For example, the software application installed on device 160 may relate to the generation of sensor output (e.g., velocity, orientation, etc.), or any other type of device output.

In some examples, the device 160 may be a permanent or replaceable component of the testing apparatus 140. In such examples, the device 160 may include UAV hardware and/or software to allow for simulation of UAV components. More specifically, the device 160 may include a computing system from the UAV. The computing system may be configured to process sensor data from one or more sensing devices on the device 160. The one or more sensing devices may be positioned on the device 160 at positions corresponding to one or more UAV sensing devices on the UAV. For instance, if the UAV has four downward-facing cameras, the device 160 may include four downward-facing cameras at the same relative positions. Such an arrangement may allow for testing of a UAV's sensing devices and associated computing system without mounting an actual UAV on the testing apparatus 140.

Figure 2:
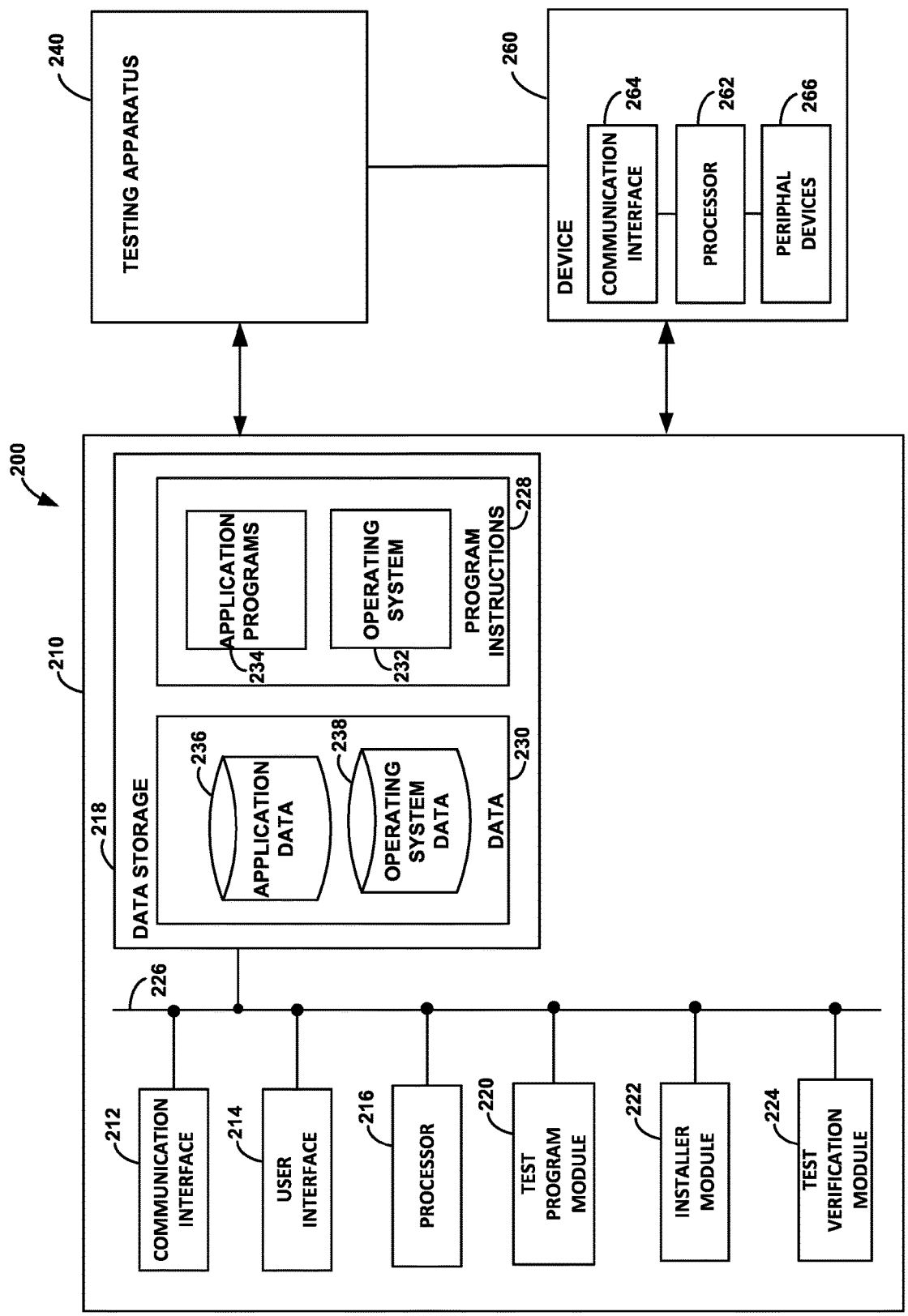
FIG. 2 illustrates a block diagram of another system for testing a device, in according to an example embodiment.

Referring now to FIG. 2, a block diagram of a system 200 for testing hardware and/or software applications for a device is illustrated. The system 200 may include a development system 210, a testing or simulation apparatus 240, and a device 260. The development system 210 may include a communication interface 212, a user interface 214, a processor 216, data storage or database 218, a test program module 220, an installer module 222, and a test verification module 224, all of which may be communicatively linked or coupled together by a system bus, network, or other connection mechanism 226.

The communication interface 212 of the development system 210 may function to allow the development system 210 to communicate, using analog or digital modulation, with other devices, access networks, and/or transport networks. For example, the development system 210 may communicate with the testing apparatus 240 and/or the device 260. Thus, the communication interface 212 may facilitate circuit-switched and/or packet-switched communication, such as POTS communication and/or IP or other packetized communication. For instance, the communication interface 212 may include a chipset and antenna arranged for wireless communication with a radio access network or an access point. Also, the communication interface 212 may take the form of a wireline interface, such as an Ethernet, Token Ring, or USB port. The communication interface 212 may also take the form of a wireless interface, such as a Wifi, BLUETOOTH®, global positioning system (GPS), or wide-area wireless interface (e.g., WiMAX or LTE). However, other forms of physical layer interfaces and other types of standard or proprietary communication protocols may be used over the communication interface 212. Furthermore, the communication interface 212 may comprise multiple physical communication interfaces (e.g., a Wifi interface, a BLUETOOTH® interface, and a wide-area wireless interface). Additionally or alternatively, the development system 210 may support remote access from another device, via the communication interface 212 or via another physical interface (not shown).

The user interface 214 of the development system 210 may function to allow the development system 210 to interact with a human or non-human user, such as to receive input from a user and to provide output to the user. The user interface 214 may include input components such as a keypad, keyboard, touch-sensitive or presence-sensitive panel, computer mouse, trackball, joystick, microphone, still camera and/or video camera. The user interface 214 may also include one or more output components such as a display screen (which, for example, may be combined with a touch-sensitive panel), CRT, LCD, LED, a display using DLP technology, printer, light bulb, and/or other similar devices, now known or later developed. The user interface 214 may also be configured to generate audible output(s), via a speaker, speaker jack, audio output port, audio output device, earphones, and/or other similar devices, now known or later developed. In some embodiments, the user interface 214 may include software, circuitry, or another form of logic that can transmit data to and/or receive data from external user input/output devices.

The processor 216 of the development system 210 may comprise one or more general purpose processors (e.g., microprocessors) and/or one or more special purpose processors (e.g., digital signal processors (DSPs), graphics processing units (GPUs), floating point units (FPUs), network processors, or application-specific integrated circuits (ASICs)). The processor 216 may be capable of executing the program instructions 228 (e.g., compiled or non-compiled program logic and/or machine code) stored in the data storage 218 to carry out the various functions and/or operations described herein.

The data storage 218 of the development system 210 may include one or more volatile and/or non-volatile storage components, such as magnetic, optical, flash, or organic storage, and may be integrated in whole or in part with the processor 216. For example, the data storage 218 may include any form of short term (e.g., random access memory (RAM) or other volatile memory component), or long term (e.g., magnetic hard disc, Flash, or any other non-volatile memory component). The data storage 218 may include removable and/or non-removable components. Further, the data storage 218 may include a non-transitory computer-readable medium, having stored thereon program instructions that, upon execution by processor 216, cause the development system 210 to carry out any of the methods, processes, techniques, and/or functions disclosed herein. For example, data storage 218 may be configured to store the program instructions 228 such as software that may execute on the processor 216 to operate the testing apparatus and/or the device 260. The execution of the program instructions 228 by the processor 216 may result in the processor 216 using data 230.

By way of example, the program instructions 228 may include an operating system 232 (e.g., an operating system kernel, device driver(s), and/or other modules) and one or more application programs 234 (e.g., software applications, test programs or software, etc.) installed on the development system 210. The application programs 234 may be downloaded to the data storage 218 of the development system 210 from a server or computing device. However, the application programs 234 can also be installed on the development system 210 in other ways, such as via a web browser or through a physical interface (e.g., a USB port) of the development system 210.

Similarly, the data 230 may include application data 236 and operating system data 238. The operating system data 238 may be accessible primarily to the operating system 232, and the application data 236 may be accessible primarily to one or more of application programs 234.

The application data 236 may be arranged in a file system that is visible to or hidden from a user of the development system 210. The application programs 234 may communicate with the operating system 232 through one or more application programming interfaces (APIs). These APIs may facilitate, for instance, the application programs 234 reading and/or writing the application data 236, transmitting or receiving information via the communication interface 202, receiving or displaying information on the user interface 204, and so on.

The test program module 220 of the development system 210 may create or store a test program that may generate one or more inputs for testing the device 260. For example, the test program module 220 may generate a test program that includes a series of inputs generated in a manner to test the operations of the device 260, such as movement or orientation changes, sensor devices, power configurations, or other hardware and/or software components depending on the device 260. In one example, the test program module 220 may automatically generate a test program. In other examples, the test program module 220 may enable a product or software developer to manually generate a series of inputs for purposes of testing the hardware and software components of the device 260. The test program module 220 may generate test programs according to any language consistent with the techniques of this disclosure.

The installer module 222 of the development system 210 may communicate with the device 260 in order to install, on the device 260, one or more software components or applications (e.g., install one or more libraries or software (not shown) on the device 260). For example, installer module 222 may communicate commands to cause the operating system of the device 260 to access software applications or programs residing on the development system 210 (e.g., identify a memory location of development system 210 in which a library or software application is stored). In another example, the installer module 222 may communicate or transmit at least a portion of the software application to the device 260 to be stored in temporary or long-term storage of the device 260. For example, the installer may transmit the test program and/or software applications to the device 260 for execution on the device 260.

The device 260 may receive the software applications and/or test program from the development system 210 and load the software applications and/or test program on the device 260 for execution. In some embodiments, the software applications and/or test programs may be downloadable to the device 260 from a server or a computing device. In other embodiments, the software applications and/or test programs can also be installed on the device 260 in other ways, such as via a web browser or through a physical interface (e.g., a USB port) on the device 260. The device 260 may execute the software applications based on one or more inputs defined by the test program running on the device 260 or the development system 210.

The test verification module 224 of the development system 210 may be operable to capture actual output of the device 260 in response to execution of the software applications by the device 260 in accordance with the test program. The test verification module 224 may analyze and/or process one or more outputs of the device 260. In one example, the test verification module 224 may capture actual output as a series of images representing output of image capture device of the device 260 in response to the test program. Once the test verification module 224 receives the output from the device 260, the test verification module 224 may analyze the output. For example, the test verification module 224 may provide a product developer or user with an indication of whether the software applications executed as expected or desired on the device 260 in response to the test program.

The testing apparatus 240 of the system 200 may be in communication with the development system 210 and/or the device 260. The testing apparatus 240 may receive control signals from the development system 210 and/or the device 260 to perform operations or functions for testing the performance of the device 260. The testing apparatus 240 may simulate operations of the device 260 and conditions of a target environment. In some embodiments, the testing apparatus 240 may perform operations to cause the device 260 to accelerate and/or move in a desired direction. For example, the testing apparatus 240 may move the device 260 back and forth along a line or axis. In addition, the testing apparatus may move the device vertically (e.g., up and down) and may position or tilt the device 260 in various orientations.

In some embodiments, the development system 210 may remotely control simulation operations of the device 260 and may receive output from the device 260. For example, the development system 210 may send control signals to the testing apparatus 240 to simulate various conditions in which the device 260 may operate. Further, the development system 210 may display a screen for controlling the operations of the testing apparatus 240 and/or device 260 and display the output information from the device 260.

Figure 3:
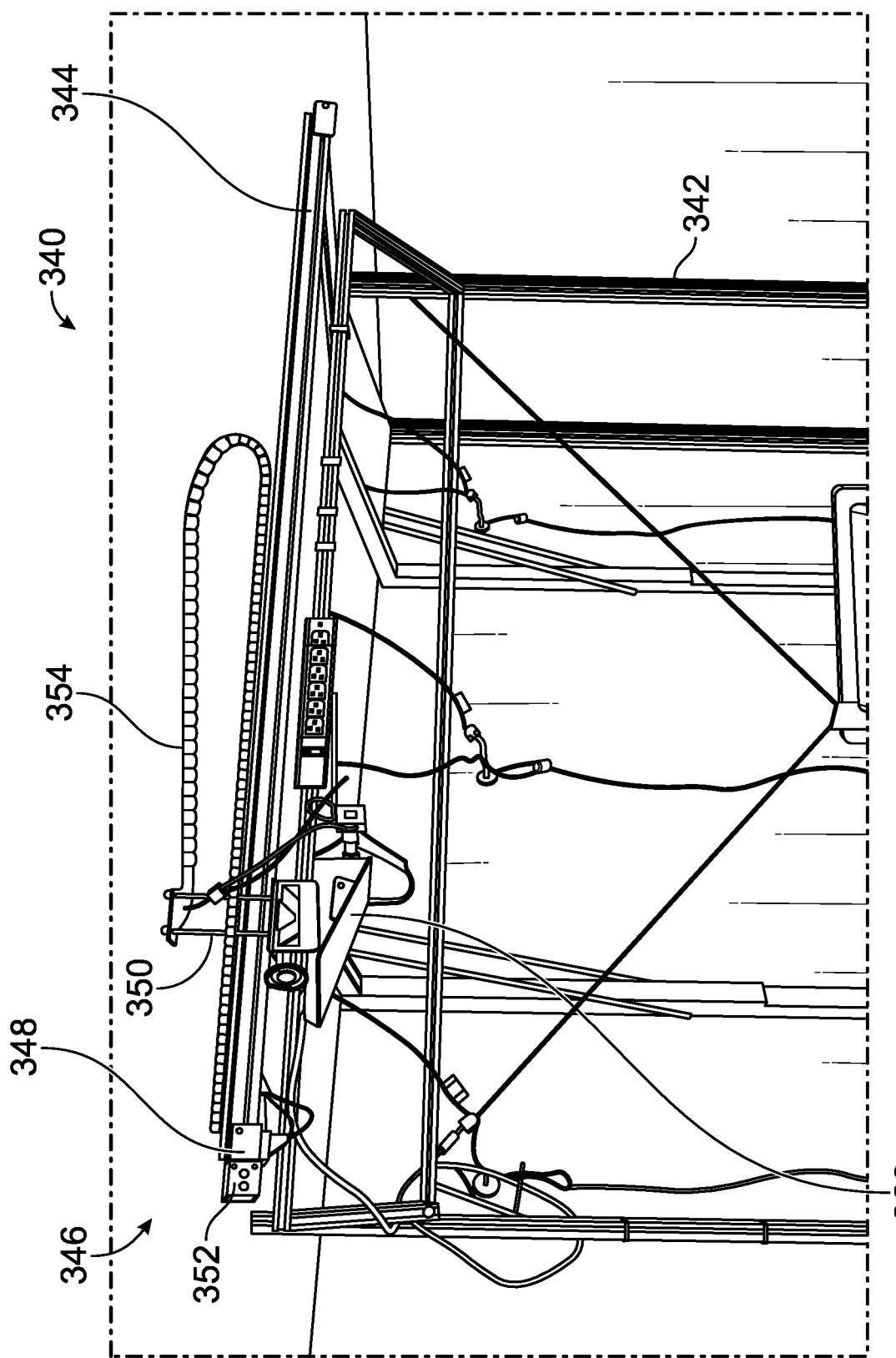
FIG. 3 illustrates a testing apparatus, according to an example embodiment.

FIG. 3 illustrates a diagram of a testing apparatus 340 for testing a device 360, in accordance with example embodiments. The testing apparatus 340 may include a frame or fixture 342, a guide rail or track 344, a motion system 346, power supply equipment or components 348 (e.g., a power supply unit), a light source (not shown), and a carriage (e.g., jig) or simulator platform 350. As shown in FIG. 3, the carriage 350 is mounted on the guide rail 344 and the guide rail 344 is mounted to the frame 342. The frame 342 and the guide rail 344 may be made from metal or any other suitable material.

The motion system 346 of the testing apparatus 340 may be activated to move the device 360 in one or more directions. The motion system 346 may include a motor or actuator 352 and a drive belt 354. In some embodiments, the motor 352 may be a stepper motor, but may also be any type of motor or actuator. The drive belt 354 of the motion system 346 may be attached to the carriage 350, and the motor 352 may be activated to drive the belt 354 to cause the carriage 350 to move along the rail 344 in one or more directions (e.g., back and forth). In other embodiments, the carriage 350 may be moved vertically (e.g., upwardly and downwardly) and/or horizontally and may be positioned or tilted at various orientations.

The power supply unit of the testing apparatus 340 may receive control signals from a development system (e.g., development system 210) and/or the device 360 to activate the power supply unit for supplying power to the motor 352 and the device 360. The power supply unit may be a programmable power supply. It will also be recognized that the power supply unit may be any suitable power supply device for supplying power to the motor 352 and/or the device 360. The light source of the testing apparatus 340 may include one or more light emitting diodes (LEDs), which may in some examples be mounted along ceiling supports.

Referring again to FIG. 2, the device 260 of the system 200 may include one or more software or hardware components. In some embodiments, the device 260 may include components of an unmanned vehicle. For example, the device 260 may include one or more components of a drone as further described below. As shown in FIG. 2, the device 260 may include a processor 262, a communications interface 264, and/or one or more peripheral devices 266.

The processor 262 of the device 260 may comprise one or more general purpose processors (e.g., microprocessors) and/or one or more special purpose processors (e.g., digital signal processors (DSPs), graphics processing units (GPUs), floating point units (FPUs), network processors, or application-specific integrated circuits (ASICs)). The processor 262 may be capable of executing program instructions (e.g., compiled or non-compiled program logic and/or machine code) stored in a data storage to carry out the various functions and/or operations described herein.

The communication interface 264 of the device 260 may function to allow the device 260 to communicate, using analog or digital modulation, with other devices, access networks, and/or transport networks. For example, the device 260 may communicate with the development system 210 and/or the testing apparatus 240. Thus, the communication interface 264 may facilitate circuit-switched and/or packet-switched communication, such as POTS communication and/or IP or other packetized communication. For instance, the communication interface 264 may include a chipset and antenna arranged for wireless communication with a radio access network or an access point. Also, the communication interface 264 may take the form of a wireline interface, such as an Ethernet, Token Ring, or USB port. The communication interface 264 may also take the form of a wireless interface, such as a Wifi, BLUETOOTH®, global positioning system (GPS), or wide-area wireless interface (e.g., WiMAX or LTE). However, other forms of physical layer interfaces and other types of standard or proprietary communication protocols may be used over the communication interface 264. Furthermore, the communication interface 264 may comprise multiple physical communication interfaces (e.g., a Wifi interface, a BLUETOOTH® interface, and a wide-area wireless interface).

The peripheral devices 266 of the device 260 may include camera or sensor components. The camera components may include, but are not limited to, an image processing device and one or more image sensors. The image processing system can include and/or can be implemented using electronic circuits or other electronic hardware, which can include one or more programmable electronic circuits (e.g., microprocessors, graphics processing units (GPUs), digital signal processors (DSPs), central processing units (CPUs), and/or other suitable electronic circuits), and/or can include and/or can be implemented using computer software, firmware, or any combination thereof, to perform the various operations described herein. While the image processing system may include certain components, one of ordinary skill will appreciate that the image processing system may include more or fewer components than described herein. For example, the image processing system may also include, in some instances, one or more memory devices (e.g., RAM, ROM, cache, buffer, and/or the like) and/or processing devices that are not shown in FIG. 2.

The camera components may be controlled at least in part by software executed by the processor 262. Further, the camera components may include multiple camera devices or systems. Each of the camera systems may include an aperture, shutter, recording surface lens, image sensor, and/or processor. In some embodiments, the device 260 may include four camera systems or image sensors. The camera systems may each be configured to capture images of one or more calibration targets or fiducials placed in the environment of the device 260 for calibrating the camera systems.

In order to perform a calibration process, the image processing system may receive any number of images from one or more of the camera system. The image processing system may calibrate multiple cameras simultaneously using the same series or group of images. In some examples, the parameters of the camera systems may be calibrated using a calibration pattern (or target pattern). For example, the cameras may be calibrated by comparing an actual image of the calibration target to a simulated image that is generated based on the model parameters of the camera. The calibration pattern may be a planar pattern such as a grid of circles or ellipses having different sizes, multiple planar patterns in different planes that include the same or different patterns, multiple spheres of the same or different sizes that are attached to a rigid structure, or other types of patterns that can be imaged by the camera systems. The target patterns may be black-and-white, grayscale, or color patterns.

In some embodiments, the peripheral devices 266 of the device 260 may include an inertial measurement unit (IMU) configured to measure and report on the velocity and orientation of the device 260 using a combination of accelerometers, gyroscopes, and magnetometers. The peripheral devices 266 may also include an inertial navigation systems (INSs) configured to estimate the motion of the device 260 moving in a three dimensional (3-D) space, including measuring linear accelerations and rotational velocities, which enable the INS to track the position and velocity of the device 260. In some embodiments, the processor of the device 260 may receive data from the inertial measurement unit (IMU) and receive images from one or more of the camera systems to estimate motion of the device 260. Based on the estimated motion of the device, the processor may determine a position or a velocity of the device. In some embodiments, the processor may compare detected fiducials in the environment to a pre-stored map.

In one embodiment, the device 260 may include an unmanned aerial vehicle (UAV). The terms "unmanned aerial vehicle" and "UAV" refer to any autonomous or semi-autonomous vehicle that is capable of performing some functions without a physically present human pilot. A UAV can take various forms. For example, a UAV may take the form of a fixed-wing aircraft, a glider aircraft, a tail-sitter aircraft, a jet aircraft, a ducted fan aircraft, a lighter-than-air dirigible such as a blimp or steerable balloon, a rotorcraft such as a helicopter or multicopter, and/or an omithopter, among other possibilities. Further, the terms "drone," "unmanned aerial vehicle system" (UAVS), or "unmanned aerial system" (UAS) may also be used to refer to a UAV.

Figure 7:
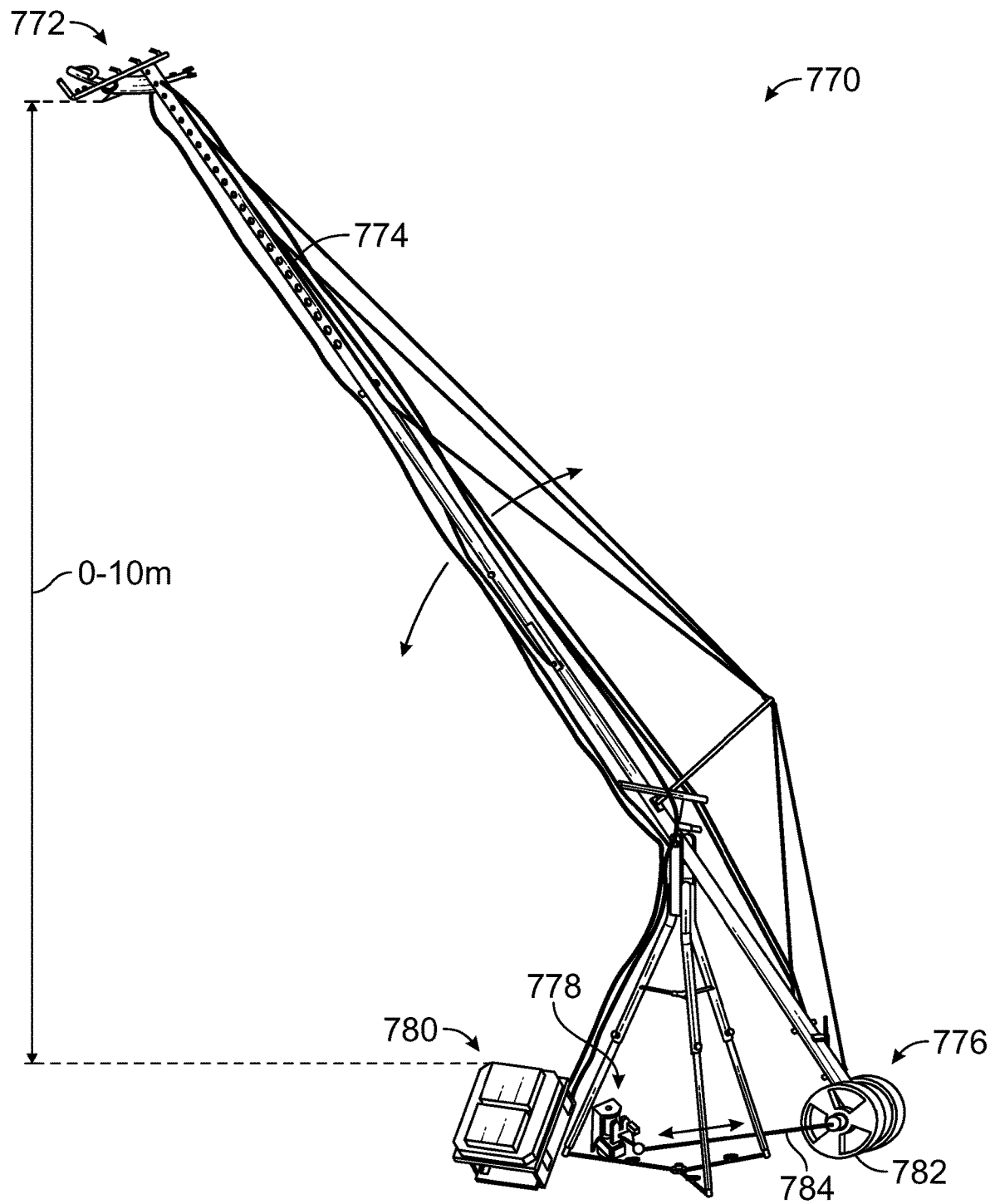
FIG. 7 illustrates another testing apparatus, according to an example embodiment.

Referring now to FIG. 7, a diagram of another testing apparatus 770 is illustrated for testing a device 772 (e.g., an avionics bay), in accordance with example embodiments. The device 772 may be similar in construction and operation to the device 260 of FIG. 2 or the device 160 of FIG. 1. The testing apparatus 770 may facilitate perception testing of the device 772 in an outdoor environment while repetitively moving the device 772 in an upward or downward direction. In one embodiment, the testing apparatus 770 may comprise an outdoor apparatus for testing the device 772. For example, the testing apparatus 770 may be used to help facilitate testing vertical descent of the device 772, such as a drone, for delivery. The testing apparatus 770 may be configured to test the device 772 at various light levels, shadows, and weather conditions (e.g., rain, standing rainwater, snow, glare, and shadows) that may pose challenges to cameras and illuminators of the device 772. Further, the testing apparatus 770 may facilitate testing of the device 772 for the detection of objects (e.g., power lines, houses, trees, etc.), ground surfaces, fiducials, and different ground textures while changing the height of the device 772.

As shown in FIG. 7, the testing apparatus 770 may include a camera boom or an elongated member 774, a winch system 776, a motor 778, and a power supply unit 780. As shown in FIG. 7, the device 772 may be mounted to one of the ends of the elongated member 774. In some embodiments, the camera boom 774 may move the device 772 between 0 and 10 meters above the ground. The camera boom 774 may be constructed from one or more boom segments and may be any suitable length. In some embodiments, the camera boom 774 may be retractable or extendable. The camera boom 774 may be made from plastic, metal, or any other suitable material.

The winch system 776 of the testing apparatus 770 includes a reel or take-up drum 782. A cable 784 may be wrapped around the drum 782 of the winch system 776. One end of rope 784 may be attached to an end of the camera boom 774 and the other end of the rope 784 may be attached to the motor 778. The motor 778 may be a stepper motor, but may also be any type of motor or actuator. The motor 778 may be activated to cause the camera boom 774 to move in an upward or downward direction.

The power supply unit 780 of the testing apparatus 770 may receive control signals from a development system (e.g., development system 210) to activate the power supply unit 780 for supplying power to the motor 778 and the device 772. The power supply unit 780 may be a programmable power supply. It will also be recognized that the power supply unit 780 may be any suitable power supply device for supplying power to the motor 778 and/or the device 772.

Figure 4:
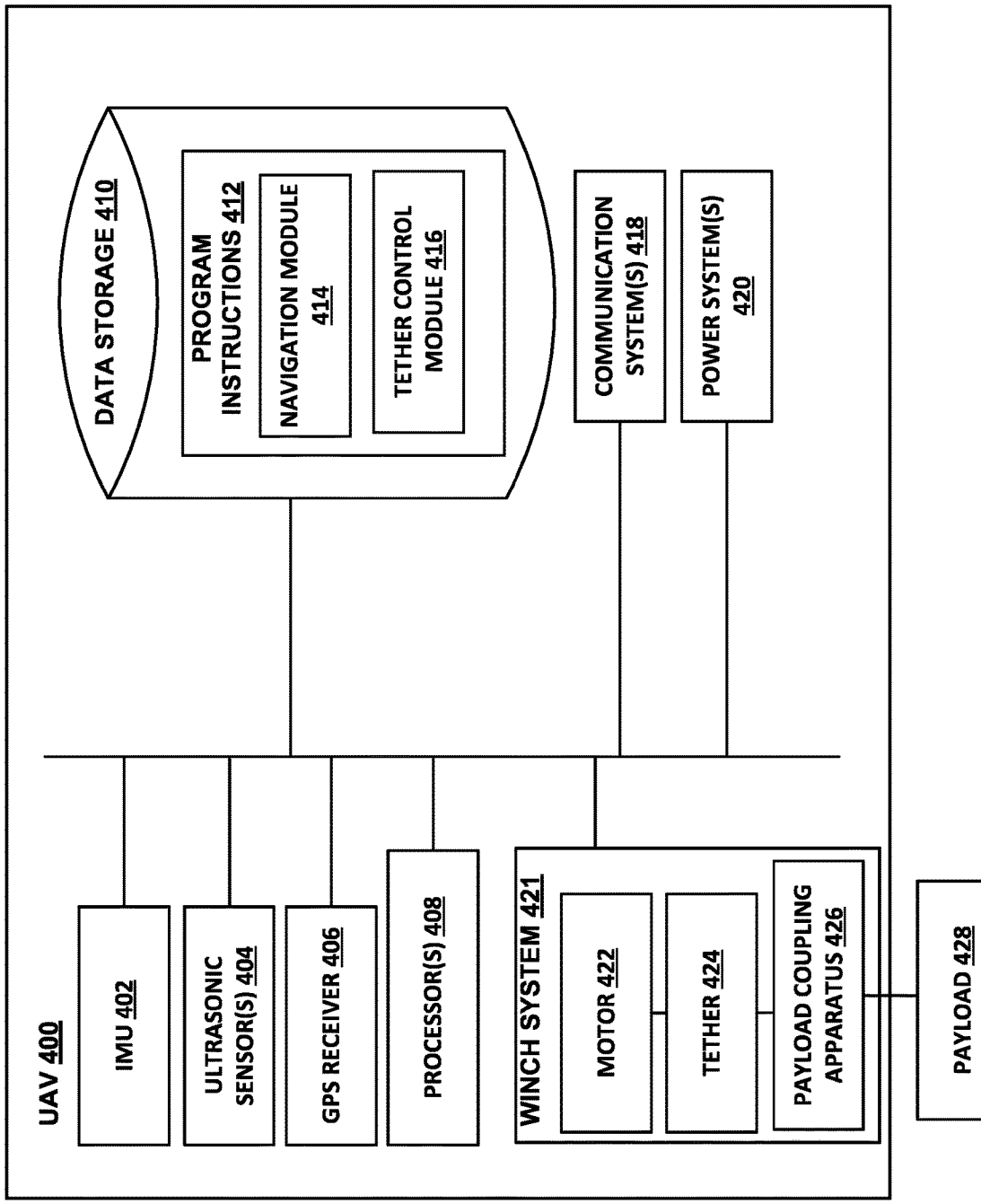
FIG. 4 is a simplified block diagram illustrating components of an unmanned aerial vehicle, in accordance with example embodiment.
Figure 5:
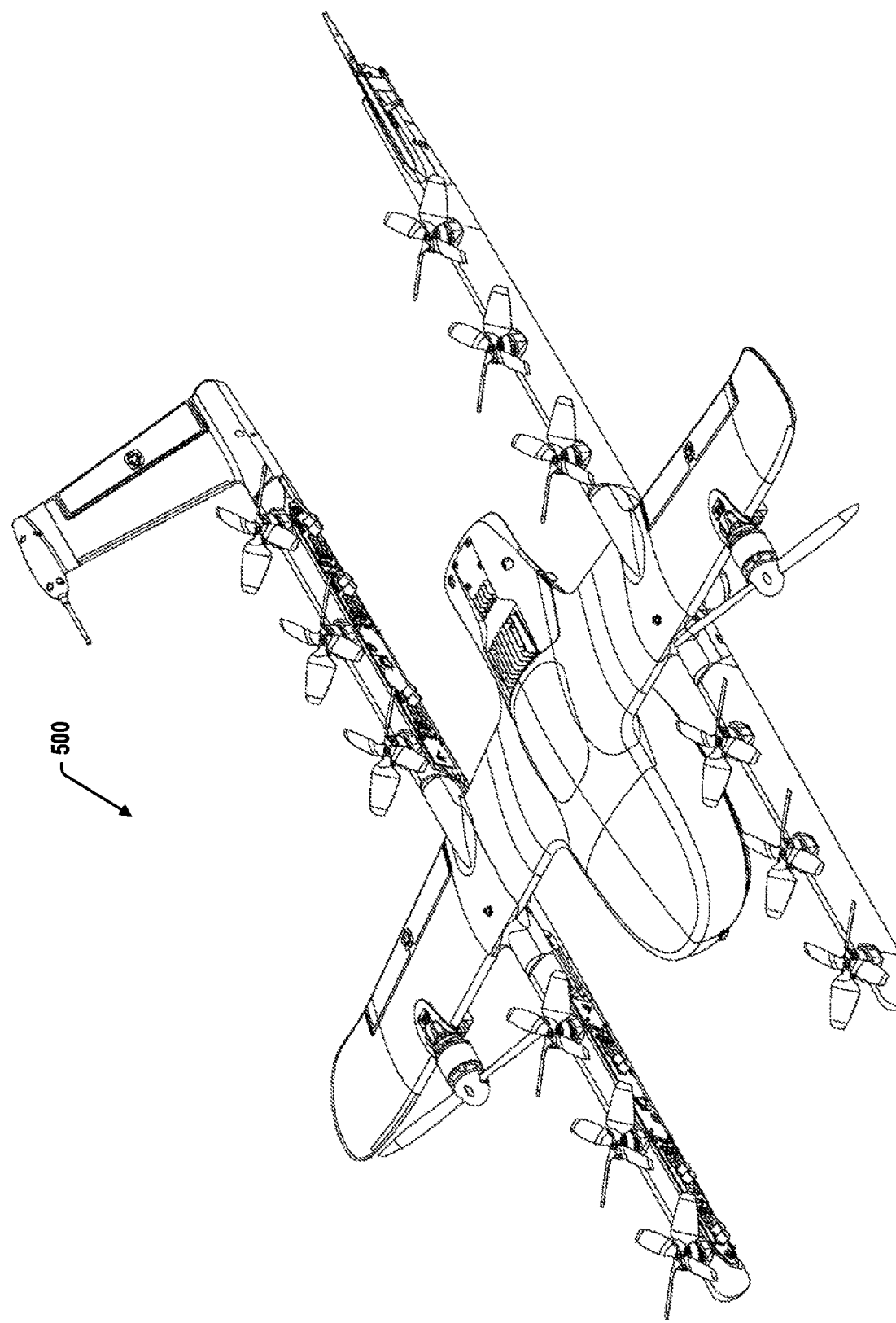
FIG. 5 is an illustration of an unmanned aerial vehicle, according to example embodiments.

FIG. 4 is a simplified block diagram illustrating components of a UAV 400, according to an example embodiment. UAV 400 may take the form of, or be similar in form to, the UAV shown in FIG. 5. However, UAV 400 may also take other forms.

UAV 400 may include various types of sensors, and may include a computing system configured to provide the functionality described herein. In the illustrated embodiment, the sensors of UAV 400 include an inertial measurement unit (IMU) 402, ultrasonic sensor(s) 404, and a GPS 406, among other possible sensors and sensing systems.

In the illustrated embodiment, UAV 400 also includes one or more processors 408. A processor 408 may be a general-purpose processor or a special purpose processor (e.g., digital signal processors, application specific integrated circuits, etc.). The one or more processors 408 can be configured to execute computer-readable program instructions 412 that are stored in the data storage 410 and are executable to provide the functionality of a UAV described herein.

The data storage 410 may include or take the form of one or more computer-readable storage media that can be read or accessed by at least one processor 408. The one or more computer-readable storage media can include volatile and/or non-volatile storage components, such as optical, magnetic, organic or other memory or disc storage, which can be integrated in whole or in part with at least one of the one or more processors 408. In some embodiments, the data storage 410 can be implemented using a single physical device (e.g., one optical, magnetic, organic or other memory or disc storage unit), while in other embodiments, the data storage 410 can be implemented using two or more physical devices.

As noted, the data storage 410 can include computer-readable program instructions 412 and perhaps additional data, such as diagnostic data of the UAV 400. As such, the data storage 410 may include program instructions 412 to perform or facilitate some or all of the UAV functionality described herein. For instance, in the illustrated embodiment, program instructions 412 include a navigation module 414 and a tether control module 416.

In an illustrative embodiment, IMU 402 may include both an accelerometer and a gyroscope, which may be used together to determine an orientation of the UAV 400. In particular, the accelerometer can measure the orientation of the vehicle with respect to earth, while the gyroscope measures the rate of rotation around an axis. IMUs are commercially available in low-cost, low-power packages. For instance, an IMU 402 may take the form of or include a miniaturized MicroElectroMechanical System (MEMS) or a NanoElectroMechanical System (NEMS). Other types of IMUs may also be utilized.

An IMU 402 may include other sensors, in addition to accelerometers and gyroscopes, which may help to better determine position and/or help to increase autonomy of the UAV 400. Two examples of such sensors are magnetometers and pressure sensors. In some embodiments, a UAV may include a low-power, digital 3-axis magnetometer, which can be used to realize an orientation independent electronic compass for accurate heading information. However, other types of magnetometers may be utilized as well. Other examples are also possible. Further, note that a UAV could include some or all of the above-described inertia sensors as separate components from an IMU.

UAV 400 may also include a pressure sensor or barometer, which can be used to determine the altitude of the UAV 400. Alternatively, other sensors, such as sonic altimeters or radar altimeters, can be used to provide an indication of altitude, which may help to improve the accuracy of and/or prevent drift of an IMU.

In a further aspect, UAV 400 may include one or more sensors that allow the UAV to sense objects in the environment. For instance, in the illustrated embodiment, UAV 400 includes ultrasonic sensor(s) 404. Ultrasonic sensor(s) 404 can determine the distance to an object by generating sound waves and determining the time interval between transmission of the wave and receiving the corresponding echo off an object. A typical application of an ultrasonic sensor for unmanned vehicles or IMUs is low-level altitude control and obstacle avoidance. An ultrasonic sensor can also be used for vehicles that need to hover at a certain height or need to be capable of detecting obstacles. Other systems can be used to determine, sense the presence of, and/or determine the distance to nearby objects, such as a light detection and ranging (LIDAR) system, laser detection and ranging (LADAR) system, and/or an infrared or forward-looking infrared (FLIR) system, among other possibilities.

In some embodiments, UAV 400 may also include one or more imaging system(s). For example, one or more still and/or video cameras may be utilized by UAV 400 to capture image data from the UAV's environment. As a specific example, charge-coupled device (CCD) cameras or complementary metal-oxide-semiconductor (CMOS) cameras can be used with unmanned vehicles. Such imaging sensor(s) have numerous possible applications, such as obstacle avoidance, localization techniques, ground tracking for more accurate navigation (e.g., by applying optical flow techniques to images), video feedback, and/or image recognition and processing, among other possibilities.

UAV 400 may also include a GPS receiver 406. The GPS receiver 406 may be configured to provide data that is typical of well-known GPS systems, such as the GPS coordinates of the UAV 400. Such GPS data may be utilized by the UAV 400 for various functions. As such, the UAV may use its GPS receiver 406 to help navigate to the caller's location, as indicated, at least in part, by the GPS coordinates provided by their mobile device. Other examples are also possible.

The navigation module 414 may provide functionality that allows the UAV 400 to, e.g., move about its environment and reach a desired location. To do so, the navigation module 414 may control the altitude and/or direction of flight by controlling the mechanical features of the UAV that affect flight (e.g., its rudder(s), elevator(s), aileron(s), and/or the speed of its propeller(s)).

In order to navigate the UAV 400 to a target location, the navigation module 414 may implement various navigation techniques, such as map-based navigation and localization-based navigation, for instance. With map-based navigation, the UAV 400 may be provided with a map of its environment, which may then be used to navigate to a particular location on the map. With localization-based navigation, the UAV 400 may be capable of navigating in an unknown environment using localization. Localization-based navigation may involve the UAV 400 building its own map of its environment and calculating its position within the map and/or the position of objects in the environment. For example, as a UAV 400 moves throughout its environment, the UAV 400 may continuously use localization to update its map of the environment. This continuous mapping process may be referred to as simultaneous localization and mapping (SLAM). Other navigation techniques may also be utilized.

In some embodiments, the navigation module 414 may navigate using a technique that relies on waypoints. In particular, waypoints are sets of coordinates that identify points in physical space. For instance, an air-navigation waypoint may be defined by a certain latitude, longitude, and altitude. Accordingly, navigation module 414 may cause the UAV 400 to move from waypoint to waypoint, in order to ultimately travel to a final destination (e.g., a final waypoint in a sequence of waypoints).

In a further aspect, the navigation module 414 and/or other components and systems of the UAV 400 may be configured for "localization" to more precisely navigate to the scene of a target location. More specifically, it may be desirable in certain situations for a UAV to be within a threshold distance of the target location where a payload 428 is being delivered by a UAV (e.g., within a few feet of the target destination). To this end, a UAV may use a two-tiered approach in which it uses a more-general location-determination technique to navigate to a general area that is associated with the target location, and then use a more-refined location-determination technique to identify and/or navigate to the target location within the general area.

For example, the UAV 400 may navigate to the general area of a target destination where a payload 428 is being delivered using waypoints and/or map-based navigation. The UAV may then switch to a mode in which it utilizes a localization process to locate and travel to a more specific location. For instance, if the UAV 400 is to deliver a payload to a user's home, the UAV 400 may need to be substantially close to the target location in order to avoid delivery of the payload to undesired areas (e.g., onto a roof, into a pool, onto a neighbor's property, etc.). However, a GPS signal may only get the UAV 400 so far (e.g., within a block of the user's home). A more precise location-determination technique may then be used to find the specific target location.

Various types of location-determination techniques may be used to accomplish localization of the target delivery location once the UAV 400 has navigated to the general area of the target delivery location. For instance, the UAV 400 may be equipped with one or more sensory systems, such as, for example, ultrasonic sensor(s) 404, infrared sensors (not shown), and/or other sensors, which may provide input that the navigation module 414 utilizes to navigate autonomously or semi-autonomously to the specific target location.

As another example, once the UAV 400 reaches the general area of the target delivery location (or of a moving subject such as a person or their mobile device), the UAV 400 may switch to a "fly-by-wire" mode where it is controlled, at least in part, by a remote operator, who can navigate the UAV 400 to the specific target location. To this end, sensory data from the UAV 400 may be sent to the remote operator to assist them in navigating the UAV 400 to the specific location.

As yet another example, the UAV 400 may include a module that is able to signal to a passer-by for assistance in either reaching the specific target delivery location; for example, the UAV 400 may display a visual message requesting such assistance in a graphic display, play an audio message or tone through speakers to indicate the need for such assistance, among other possibilities. Such a visual or audio message might indicate that assistance is needed in delivering the UAV 400 to a particular person or a particular location, and might provide information to assist the passer-by in delivering the UAV 400 to the person or location (e.g., a description or picture of the person or location, and/or the person or location's name), among other possibilities. Such a feature can be useful in a scenario in which the UAV is unable to use sensory functions or another location-determination technique to reach the specific target location. However, this feature is not limited to such scenarios.

In some embodiments, once the UAV 400 arrives at the general area of a target delivery location, the UAV 400 may utilize a beacon from a user's remote device (e.g., the user's mobile phone) to locate the person. Such a beacon may take various forms. As an example, consider the scenario where a remote device, such as the mobile phone of a person who requested a UAV delivery, is able to send out directional signals (e.g., via an RF signal, a light signal and/or an audio signal). In this scenario, the UAV 400 may be configured to navigate by "sourcing" such directional signals—in other words, by determining where the signal is strongest and navigating accordingly. As another example, a mobile device can emit a frequency, either in the human range or outside the human range, and the UAV 400 can listen for that frequency and navigate accordingly. As a related example, if the UAV 400 is listening for spoken commands, then the UAV 400 could utilize spoken statements, such as "I'm over here!" to source the specific location of the person requesting delivery of a payload.

In an alternative arrangement, a navigation module may be implemented at a remote computing device, which communicates wirelessly with the UAV 400. The remote computing device may receive data indicating the operational state of the UAV 400, sensor data from the UAV 400 that allows it to assess the environmental conditions being experienced by the UAV 400, and/or location information for the UAV 400. Provided with such information, the remote computing device may determine latitudinal and/or directional adjustments that should be made by the UAV 400 and/or may determine how the UAV 400 should adjust its mechanical features (e.g., its rudder(s), elevator(s), aileron(s), and/or the speed of its propeller(s)) in order to effectuate such movements. The remote computing system may then communicate such adjustments to the UAV 400 so it can move in the determined manner.

In a further aspect, the UAV 400 includes one or more communication systems 418. The communications systems 418 may include one or more wireless interfaces and/or one or more wireline interfaces, which allow the UAV 400 to communicate via one or more networks. Such wireless interfaces may provide for communication under one or more wireless communication protocols, such as Bluetooth, WiFi (e.g., an IEEE 802.11 protocol), Long-Term Evolution (LTE), WiMAX (e.g., an IEEE 802.16 standard), a radio-frequency ID (RFID) protocol, near-field communication (NFC), and/or other wireless communication protocols. Such wireline interfaces may include an Ethernet interface, a Universal Serial Bus (USB) interface, or similar interface to communicate via a wire, a twisted pair of wires, a coaxial cable, an optical link, a fiber-optic link, or other physical connection to a wireline network.

In some embodiments, a UAV 400 may include communication systems 418 that allow for both short-range communication and long-range communication. For example, the UAV 400 may be configured for short-range communications using Bluetooth and for long-range communications under a CDMA protocol. In such an embodiment, the UAV 400 may be configured to function as a "hot spot;" or in other words, as a gateway or proxy between a remote support device and one or more data networks, such as a cellular network and/or the Internet. Configured as such, the UAV 400 may facilitate data communications that the remote support device would otherwise be unable to perform by itself.

For example, the UAV 400 may provide a WiFi connection to a remote device, and serve as a proxy or gateway to a cellular service provider's data network, which the UAV might connect to under an LTE or a 3G protocol, for instance. The UAV 400 could also serve as a proxy or gateway to a high-altitude balloon network, a satellite network, or a combination of these networks, among others, which a remote device might not be able to otherwise access.

In a further aspect, the UAV 400 may include power system(s) 420. The power system 420 may include one or more batteries for providing power to the UAV 400. In one example, the one or more batteries may be rechargeable and each battery may be recharged via a wired connection between the battery and a power supply and/or via a wireless charging system, such as an inductive charging system that applies an external time-varying magnetic field to an internal battery.

The UAV 400 may employ various systems and configurations in order to transport and deliver a payload 428. In some implementations, the payload 428 of a given UAV 400 may include or take the form of a "package" designed to transport various goods to a target delivery location. For example, the UAV 400 can include a compartment, in which an item or items may be transported. Such a package may include one or more food items, purchased goods, medical items, or any other object(s) having a size and weight suitable to be transported between two locations by the UAV. In other embodiments, a payload 428 may simply be the one or more items that are being delivered (e.g., without any package housing the items).

In some embodiments, the payload 428 may be attached to the UAV and located substantially outside of the UAV during some or all of a flight by the UAV. For example, the package may be tethered or otherwise releasably attached below the UAV during flight to a target location. In some embodiments, the package may include various features that protect its contents from the environment, reduce aerodynamic drag on the system, and prevent the contents of the package from shifting during UAV flight. In other embodiments, the package may be a standard shipping package that is not specifically tailored for UAV flight.

In order to deliver the payload, the UAV may include a winch system 421 controlled by the tether control module 416 in order to lower the payload 428 to the ground while the UAV hovers above. As shown in FIG. 2, the winch system 421 may include a tether 424, and the tether 424 may be coupled to the payload 428 by a payload retriever 426. The tether 424 may be wound on a spool that is coupled to a motor 422 of the UAV. The motor 422 may take the form of a DC motor (e.g., a servo motor) that can be actively controlled by a speed controller. The tether control module 416 can control the speed controller to cause the motor 422 to rotate the spool, thereby unwinding or retracting the tether 424 and lowering or raising the payload retriever 426. In practice, the speed controller may output a desired operating rate (e.g., a desired RPM) for the spool, which may correspond to the speed at which the tether 424 and payload 428 should be lowered towards the ground. The motor 422 may then rotate the spool so that it maintains the desired operating rate.

In order to control the motor 422 via the speed controller, the tether control module 416 may receive data from a speed sensor (e.g., an encoder) configured to convert a mechanical position to a representative analog or digital signal. In particular, the speed sensor may include a rotary encoder that may provide information related to rotary position (and/or rotary movement) of a shaft of the motor or the spool coupled to the motor, among other possibilities. Moreover, the speed sensor may take the form of an absolute encoder and/or an incremental encoder, among others. So in an example implementation, as the motor 422 causes rotation of the spool, a rotary encoder may be used to measure this rotation. In doing so, the rotary encoder may be used to convert a rotary position to an analog or digital electronic signal used by the tether control module 416 to determine the amount of rotation of the spool from a fixed reference angle and/or to an analog or digital electronic signal that is representative of a new rotary position, among other options. Other examples are also possible.

Based on the data from the speed sensor, the tether control module 416 may determine a rotational speed of the motor 422 and/or the spool and responsively control the motor 422 (e.g., by increasing or decreasing an electrical current supplied to the motor 422) to cause the rotational speed of the motor 422 to match a desired speed. When adjusting the motor current, the magnitude of the current adjustment may be based on a proportional-integral-derivative (PID) calculation using the determined and desired speeds of the motor 422. For instance, the magnitude of the current adjustment may be based on a present difference, a past difference (based on accumulated error over time), and a future difference (based on current rates of change) between the determined and desired speeds of the spool.

In some embodiments, the tether control module 416 may vary the rate at which the tether 424 and payload 428 are lowered to the ground. For example, the speed controller may change the desired operating rate according to a variable deployment-rate profile and/or in response to other factors in order to change the rate at which the payload 428 descends toward the ground. To do so, the tether control module 416 may adjust an amount of braking or an amount of friction that is applied to the tether 424. For example, to vary the tether deployment rate, the UAV 400 may include friction pads that can apply a variable amount of pressure to the tether 424. As another example, the UAV 400 can include a motorized braking system that varies the rate at which the spool lets out the tether 424. Such a braking system may take the form of an electromechanical system in which the motor 422 operates to slow the rate at which the spool lets out the tether 424. Further, the motor 422 may vary the amount by which it adjusts the speed (e.g., the RPM) of the spool, and thus may vary the deployment rate of the tether 424. Other examples are also possible.

In some embodiments, the tether control module 416 may be configured to limit the motor current supplied to the motor 422 to a maximum value. With such a limit placed on the motor current, there may be situations where the motor 422 cannot operate at the desired operation specified by the speed controller. For instance, as discussed in more detail below, there may be situations where the speed controller specifies a desired operating rate at which the motor 422 should retract the tether 424 toward the UAV 400, but the motor current may be limited such that a large enough downward force on the tether 424 would counteract the retracting force of the motor 422 and cause the tether 424 to unwind instead. And as further discussed below, a limit on the motor current may be imposed and/or altered depending on an operational state of the UAV 400.

In some embodiments, the tether control module 416 may be configured to determine a status of the tether 424 and/or the payload 428 based on the amount of current supplied to the motor 422. For instance, if a downward force is applied to the tether 424 (e.g., if the payload 428 is attached to the tether 424 or if the tether 424 gets snagged on an object when retracting toward the UAV 400), the tether control module 416 may need to increase the motor current in order to cause the determined rotational speed of the motor 422 and/or spool to match the desired speed. Similarly, when the downward force is removed from the tether 424 (e.g., upon delivery of the payload 428 or removal of a tether snag), the tether control module 416 may need to decrease the motor current in order to cause the determined rotational speed of the motor 422 and/or spool to match the desired speed. As such, the tether control module 416 may be configured to monitor the current supplied to the motor 422. For instance, the tether control module 416 could determine the motor current based on sensor data received from a current sensor of the motor or a current sensor of the power system 420. In any case, based on the current supplied to the motor 422, determine if the payload 428 is attached to the tether 424, if someone or something is pulling on the tether 424, and/or if the payload retriever 426 is pressing against the UAV 400 after retracting the tether 424. Other examples are possible as well.

During delivery of the payload 428, the payload retriever 426 can be configured to secure the payload 428 while being lowered from the UAV by the tether 424, and can be further configured to release the payload 428 upon reaching ground level. The payload retriever 426 can then be retracted to the UAV by reeling in the tether 424 using the motor 422.

In some implementations, the payload 428 may be passively released once it is lowered to the ground. For example, a passive release mechanism may include one or more swing arms adapted to retract into and extend from a housing. An extended swing arm may form a hook on which the payload 428 may be attached. Upon lowering the release mechanism and the payload 428 to the ground via a tether, a gravitational force as well as a downward inertial force on the release mechanism may cause the payload 428 to detach from the hook allowing the release mechanism to be raised upwards toward the UAV. The release mechanism may further include a spring mechanism that biases the swing arm to retract into the housing when there are no other external forces on the swing arm. For instance, a spring may exert a force on the swing arm that pushes or pulls the swing arm toward the housing such that the swing arm retracts into the housing once the weight of the payload 428 no longer forces the swing arm to extend from the housing. Retracting the swing arm into the housing may reduce the likelihood of the release mechanism snagging the payload 428 or other nearby objects when raising the release mechanism toward the UAV upon delivery of the payload 428.

Active payload release mechanisms are also possible. For example, sensors such as a barometric pressure based altimeter and/or accelerometers may help to detect the position of the release mechanism (and the payload) relative to the ground. Data from the sensors can be communicated back to the UAV and/or a control system over a wireless link and used to help in determining when the release mechanism has reached ground level (e.g., by detecting a measurement with the accelerometer that is characteristic of ground impact). In other examples, the UAV may determine that the payload has reached the ground based on a weight sensor detecting a threshold low downward force on the tether and/or based on a threshold low measurement of power drawn by the winch when lowering the payload.

Other systems and techniques for delivering a payload, in addition or in the alternative to a tethered delivery system are also possible. For example, a UAV 400 could include an air-bag drop system or a parachute drop system. Alternatively, a UAV 400 carrying a payload could simply land on the ground at a delivery location. Other examples are also possible.

Figure 6:
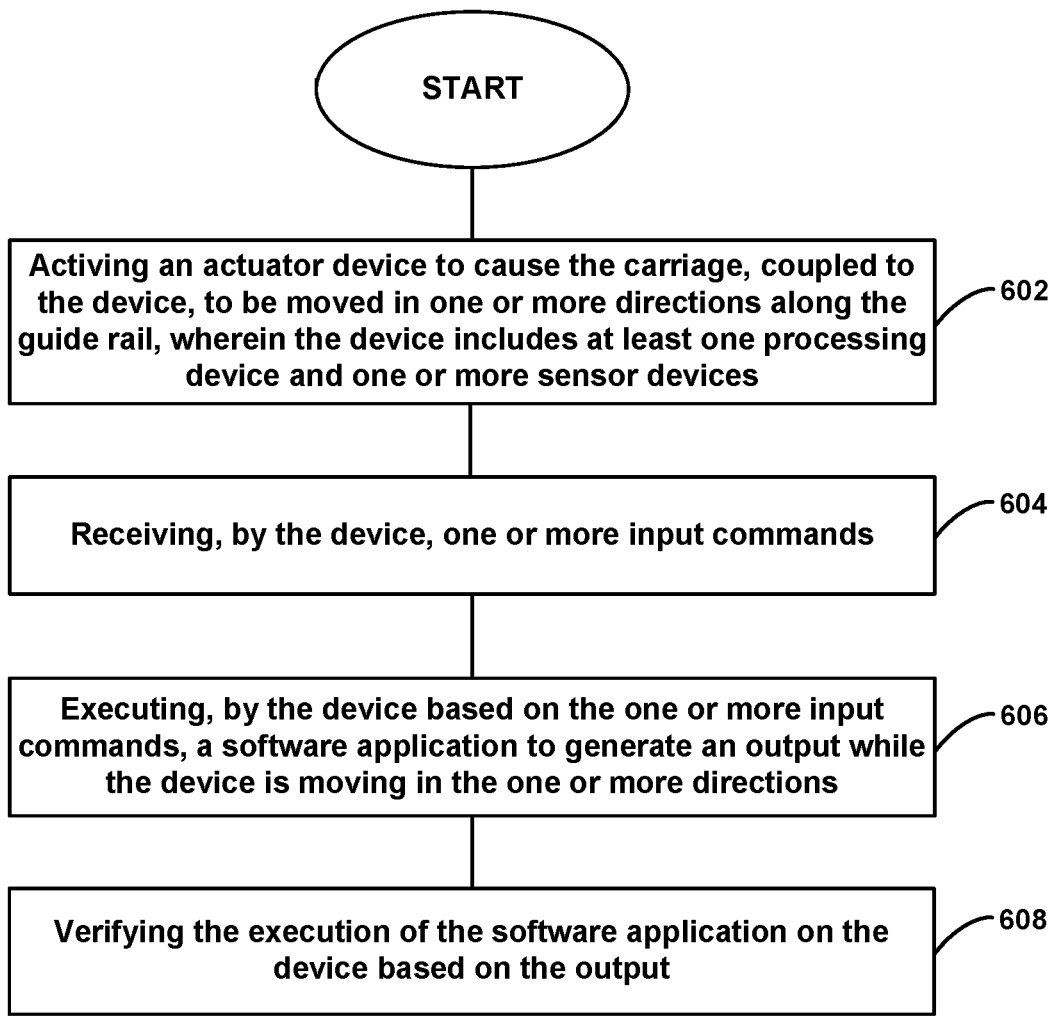
FIG. 6 depicts an illustrative flow diagram of an example method, according to an example embodiment.

Referring again to the drawings, FIG. 6 illustrates example aspects of a method 600 for testing the hardware and software components of a device. The method 600 represents an example method that may include one or more operations as depicted by one or more blocks 602-608, each of which may be carried out by any of the systems shown in FIGS. 1 and 2, among other possible embodiments. In an example implementation, a testing system (e.g., the system 100 of FIG. 1 or system 200 of FIG. 2) performs the illustrated operations, although in other implementations, one or more other systems can perform some or all of the operations.

Those skilled in the art will understand that the flow diagrams or charts described herein illustrate functionality and operations of certain implementations of the present disclosure. In this regard, each block of the flow diagrams may represent a module, a segment, or a portion of program code, which includes one or more instructions executable by one or more processors for implementing specific logical functions or steps in the processes. The program code may be stored on any type of computer readable medium, for example, such as a storage device including a disk or hard drive.

In addition, each block may represent circuitry that is wired to perform the specific logical functions in the processes. Alternative implementations are included within the scope of the example embodiments of the present application in which functions may be executed out of order from that shown or discussed, including substantially concurrent or in reverse order, depending on the functionality involved, as would be understood by those reasonably skilled in the art. Within examples, any system may cause another system to perform one or more of the operations (or portions of the operations) described below.

Referring now to FIG. 6, the method 600 may be used to test the hardware and software of a device. The method 600 may use a testing apparatus that includes a carriage mounted to a guide rail for testing the device. At block 602, the method involves activating an actuator device to cause the carriage, coupled to the device, to be moved in one or more directions along the guide rail, wherein the device includes at least one processing device and one or more sensor devices. At block 604, the method 600 involves receiving, by the device, one or more input commands. At block 606, the method 600 involves executing, by the device based on the one or more input commands, a software application to generate an output while the device is moving in the one or more directions. At block 608, the method 600 involves verifying the execution of the software application on the device based on the output.

Example methods, systems, and apparatus are described herein in accordance with one or more aspects associated with testing devices. Generally, any of the components, modules, methods, and operations described herein can be implemented using software, firmware, hardware (e.g., fixed logic circuitry), manual processing, or any combination thereof. Some operations of the example methods may be described in the general context of executable instructions stored on computer-readable storage memory that is local and/or remote to a computer processing system, and implementations can include software applications, programs, functions, and the like. Alternatively or in addition, any of the functionality described herein can be performed, at least in part, by one or more hardware logic components, such as, and without limitation, Field-programmable Gate Arrays (FPGAs), Application-Specific Integrated Circuits (ASICs), Application-Specific Standard Products (ASSPs), System-on-a-Chip systems (SoCs), or Complex Programmable Logic Devices (CPLDs).

Further, the above detailed description describes various features and operations of the disclosed systems, apparatus, and methods with reference to the accompanying figures. While various aspects and embodiments have been disclosed herein, other aspects and embodiments will be apparent. The various aspects and embodiments disclosed herein are for purposes of illustration and are not intended to be limiting, with the true scope being indicated by the following claims.

What is claimed is:

1. A testing apparatus for testing a device comprising:
   a frame;
   a guide rail supported by the frame;
   a reference object positioned relative to the frame;
   a carriage configured to be movably mounted to the guide rail, wherein the device is configured to be coupled to the carriage, wherein the device includes a processing device and sensor devices, wherein the sensor devices comprise: (i) an image capture device configured to capture an image of the reference object and (ii) an inertial measurement unit (IMU);
   an actuator device configured to cause the carriage to move along the guide rail;
   a computing device in communication with the actuator device, wherein the actuator device is configured to be activated based on commands from the computing device to cause the carriage to move in one or more directions; and
   the device, wherein the device is configured to perform operations comprising:
      receiving, by the processing device, IMU data from the IMU while the carriage moves the device relative to the reference object;
      receiving, by the processing device, image data from the image capture device while the carriage moves the device relative to the reference object; and
      testing, using the processing device, motion estimation software of the device by determining an estimate of motion of the device based on the IMU data and the image data.

2. The testing apparatus of claim 1, wherein the carriage is moved between a first position and a second position.

3. The testing apparatus of claim 1, wherein the IMU is configured to measure a velocity and orientation of the device.

4. The testing apparatus of claim 1, further including a light source coupled to the frame, wherein the light source is configured to illuminate the reference object during capture of the image data by the image capture device.

5. The testing apparatus of claim 4, wherein the light source comprises one or more light emitting diodes.

6. The testing apparatus of claim 1, wherein the actuator device comprises a stepper motor.

7. The testing apparatus of claim 1, further comprising a drive belt coupled to the carriage, wherein the drive belt is driven by the actuator device to cause the carriage to move back and forth.

8. The testing apparatus of claim 1, further comprising a power supply unit configured to supply power to the device.

9. The testing apparatus of claim 1, wherein the device is configured to operate based on inputs or commands from the computing device.

10. The testing apparatus of claim 1, wherein the computing device is configured to generate inputs for the device.

11. The test apparatus of claim 1, wherein the device comprises a computing system from an unmanned aerial vehicle (UAV), wherein the computing system is configured to process sensor data from the sensor devices, and wherein the sensor devices are positioned on the device at positions corresponding to positions of UAV sensor devices on the UAV.

12. The testing apparatus of claim 1, wherein the device is configured to test the motion estimation software by comparing (i) the estimate of motion of the device to (ii) a reference motion performed by the carriage during capture of the IMU data and the image data.

13. The testing apparatus of claim 1, wherein the IMU data is synchronized with the image data.

14. The testing apparatus of claim 1, wherein the motion estimation software forms part of a software release for one or more aerial vehicles, and wherein the testing of the motion estimation software is performed prior to deployment of the software release onto the one or more aerial vehicles.

15. A method of testing a device using a testing apparatus that includes (i) a frame, (ii) a guide rail supported by the frame, (iii) a reference object positioned relative to the frame, and (iv) a carriage movably mounted to the guide rail, the method comprising:
   activating an actuator device to cause the carriage, coupled to the device, to be moved in one or more directions along the guide rail, wherein the device includes a processing device and sensor devices, wherein the sensor devices comprise: (i) an image capture device configured to capture an image of the reference object and (ii) an inertial measurement unit (IMU);
   receiving, by the processing device, IMU data from the IMU while the carriage moves the device relative to the reference object;
   receiving, by the processing device, image data from the image capture device while the carriage moves the device relative to the reference object;
   testing, using the processing device, motion estimation a software of the device by determining an estimate of motion of the device based on the IMU data and the image data; and
   verifying the motion estimation software based on the estimate of motion of the device.

16. The method of claim 15, further comprising:
   calibrating the image capture device based on the image data.

17. The method of claim 15, further comprising:
   executing, by a host computer, a test program to generate inputs for the device.

18. The method of claim 15, wherein the device is moved between a first position and a second position for a period of time.

19. The method of claim 15, wherein determining the estimate of motion of the device comprises:

determining one or more of a position of the device or a velocity of the device based on the IMU data and the image data.

20. A non-transitory computer-readable medium storing instructions, the instructions being executable by one or more processors to perform functions comprising:
  activating an actuator device to cause a carriage, coupled to a device, to be moved in one or more directions along a guide rail, wherein the device includes a processing device and sensor devices, wherein the carriage and the guide rail form part of a testing apparatus that comprises a frame that supports the guide rail and a reference object positioned relative to the frame, and wherein the sensor devices comprise: (i) an image capture device configured to capture an image of the reference object and (ii) an inertial measurement unit (IMU); and
  causing the device to test motion estimation software of the device by:
    causing the device to receive, by the processing device, IMU data from the IMU while the carriage moves the device relative to the reference object;
    causing the device to receive, by the processing device, image data from the image capture device while the carriage moves the device relative to the reference object; and
    causing the device to determine an estimate of motion of the device based on the IMU data and the image data; and
  verifying the motion estimation software based on the estimate of motion of the device.

* * * * *